United States Patent [19]

Menzel et al.

[11] 4,269,357
[45] May 26, 1981

[54] CONTINUOUS DRIP IRRIGATION TUBE

[75] Inventors: S. W. O. Menzel, Adelaide, Australia; Donald E. Mock, Covina, Calif.; David E. Mominee, Alpine, Calif.; Gilbert W. Vance, Jamul, Calif.; Dale P. Zauner, LaJolla, Calif.

[73] Assignee: RIS Irrigation Systems, El Cajon, Calif.

[21] Appl. No.: 875,518

[22] Filed: Feb. 6, 1978

[30] Foreign Application Priority Data

Feb. 8, 1977 [AU] Australia ............................ PC8985

[51] Int. Cl.³ .............................................. A01G 25/02
[52] U.S. Cl. .................................. 239/272; 138/111; 138/115; 239/450; 239/542; 264/171
[58] Field of Search ............... 239/145, 450, 542, 547, 239/271, 272; 138/111, 112, 114, 115, 40, 128, 168; 405/44, 51; 264/171, 173, 177 R

[56] References Cited

U.S. PATENT DOCUMENTS

| | | | |
|---|---|---|---|
| 2,674,032 | 4/1954 | Martin et al. | 138/40 X |
| 2,705,662 | 4/1955 | Leonard, Jr. | 239/450 X |
| 3,467,142 | 9/1969 | Boyle et al. | 138/111 |
| 3,517,702 | 6/1970 | Mueller et al. | 138/128 |
| 3,654,049 | 4/1972 | Ausnit | 138/168 X |
| 3,672,571 | 6/1972 | Goodricke | 239/145 |
| 3,860,179 | 1/1975 | Costa | 239/542 |
| 3,874,598 | 4/1975 | Havens | 239/450 X |
| 3,973,732 | 8/1976 | Diggs | 239/542 X |
| 4,009,832 | 3/1977 | Tiedt | 239/542 |
| 4,123,006 | 10/1978 | Yukishita | 239/450 X |

*Primary Examiner*—Andres Kashnikow
*Attorney, Agent, or Firm*—Gordon L. Peterson

[57] ABSTRACT

A continuous drip irrigation tube having a series of longitudinally extending capillary tubes formed on its wall integrally with said wall.

9 Claims, 8 Drawing Figures

CONTINUOUS DRIP IRRIGATION TUBE

FIELD OF THE INVENTION

This invention relates to drip irrigation, and more particularly to a method and means whereby the drip irrigation can be provided in a simple and economical manner.

THE PRIOR ART

It is known to provide low pressure drip irrigation tubes that emit measured quantities of water of their entire length at given intervals to provide the irrigation of row crops such as vegetables, sugar cane etc. One method of achieving this has been by the use of tubes having a twin wall configuration and small (that is 0.5 millimeters) holes to control the flow from the inner tube to the outer chamber. However this process has inherent problems in that it requires complex equipment to form or "drill" the holes such as by a laser beam, and this requires a means to drill the hole from the inner chamber to the outer chamber by drilling through the two chambers with the outer hole being subsequently blocked off.

Another method of providing drip irrigations tubes to emit measured quantities of water over their entire length at given intervals is to insert small orifices or capillary tubes (for example 0.75 millimeters) into the main tube or conduit, and depending on the length of these tubes the output from the capillary tubes can be controlled.

Also other methods of achieving drip irrigation are known, and these include the well known type of emitters, torturous path membranes and the like.

OBJECTIVES OF THE INVENTION

It is an object of this invention to provide a low pressure drip irrigation tube in the form of a continuous tube which can be produced in a simple and economical manner.

It is also a further object of this invention to provide a drip irrigation tube which can be readily tailored to suit the desired conditions of use so that the points of outlet of the drips can be selected as desired.

SUMMARY OF THE INVENTION

Thus in one form according to the invention there is provided a method of forming a low pressure drip irrigation tube, including the steps of extruding a flat strip section, the strip section having intermediate its width and running longitudinally of the section a series of capillary tubes, joining the edges of the flat strip to form a large conduit, holes being formed through the wall of the capillary tubes at appropriate locations inside of the tube to open into the now formed conduits, and further apertures being provided on the outside of the tube to allow the water to drip from the capillary tube onto the desired point of use or to flow into a distributor.

Thus there is provided according to the invention a low pressure drip irrigation tube formed of a flat strip which is joined to form a conduit, the strip having formed longitudinally of its length a series of capillary tubes, and apertures being provided in thewalls of the capillary tube to allow water to flow into the capillary tubes from so-called conduit, these apertures being spaced at relatively long intervals along the capillary tubes, and a further aperture or apertures through the wall of the capillary tube on the opposite side thereof to allow the water to drip from these apertures on to the desired location of use or to feed distributor devices.

In one form the flat strip section can be simply extruded with the capillary tubes, for example three or more being formed centrally of the width of the flat strip these being of a relatively thin wall section.

The edges of the flat strip can be simply welded together to form the conduit, or the outer edges can be formed with an interlocking configuration to allow the strip to be "zipped" together to form the tube. The interlocking configuration could be a bead like member formed along the edge of one side of the strip, and a generally "U" shaped or semi-enclosed socket formed along the other longitudinal edge of the strip. In a preferred form one edge of the strip could have an arrowhead shape, and the other edge have a channel shaped section with inturned side edges so that the outer channel shaped section and the inturned edges of the channel grip and seal behind the outer edges of the arrowhead shape, so that when water is then passed into the so formed conduit or tube the pressure of the water causes the trailing edges of the arrowhead to seal against the corners of the inturned edges of the channel.

Preferably at least three capillary tubes can be extruded into the longitudinal strip and one, some or all of these can be used for the production of the drip feed at the required localities.

Thus with this invention the advantage is that in the field or in remote locations a drip tube can be simply tailored to the field requirements by simply forming apertures into the wall of the capillary tubes which are formed in the extrusion, these apertures being spaced at relatively long intervals along the tube, the tube is then formed by either welding or engaging the longitudinal edges of the strip, and similar apertures are formed in the opposite side of the capillary tube, these apertures being preferably centrally located between any two of the first mentioned apertures. This allows the water to pass from the water carrying conduit into the capillary tube section thus reducing the pressure during its outlet passage.

Where a larger number of such capillary tubes are formed in the wall of the water carrying conduit, similar apertures can be cut, but at varying increments, thus giving options to obtain long capillary passages, for example one meter or more, but as for many crops the outlets need to be 30 centimeter spacing three such capillary tubes would normally meet the requirements.

Thus the apertures can be formed as desired, and if no apertures are required for a certain distance of a number of meters, then no disadvantage results by not forming any apertures therein.

Also as the outlet spacings can be varied to suit the topography or friction loss problems of the water carrying conduit, the tube can also be either welded or formed spirally or welded longitudinally and can also be tapered over its length to suit the hydraulic variations thus maintaining uniform discharge over the length of the tube and in case of spiral winding also increasing the strength of the tube.

A further alternative of making the apertures is to drive a tubular barbed rivet, the rivet being hollow and having an opening actually along its length but terminating at the head of the rivet and with an aperture opening sideways out of the shank of the rivet so that the rivet can be passed through the capillary tube section from the outside so as to allow water to pass from the water carrying conduit into the capillary tube, with the head of the rivet sealing the outer edge or wall of the capillary tube. Alternatively the rivet can also be of a flexible nature with such a configuration that a measure of pressure compensation can result during the passage of water through the device.

DETAILED DESCRIPTION OF EMBODIMENTS

Figure 1:
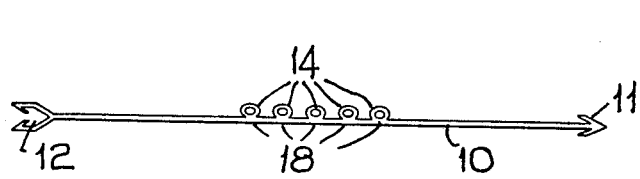
FIG. 1 is an end elevation of a strip.
Figure 2:
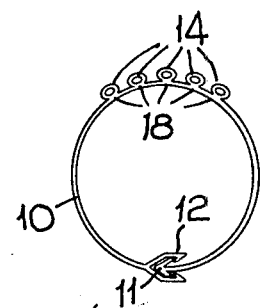
FIG. 2 shows it formed into a tube.
Figure 5:
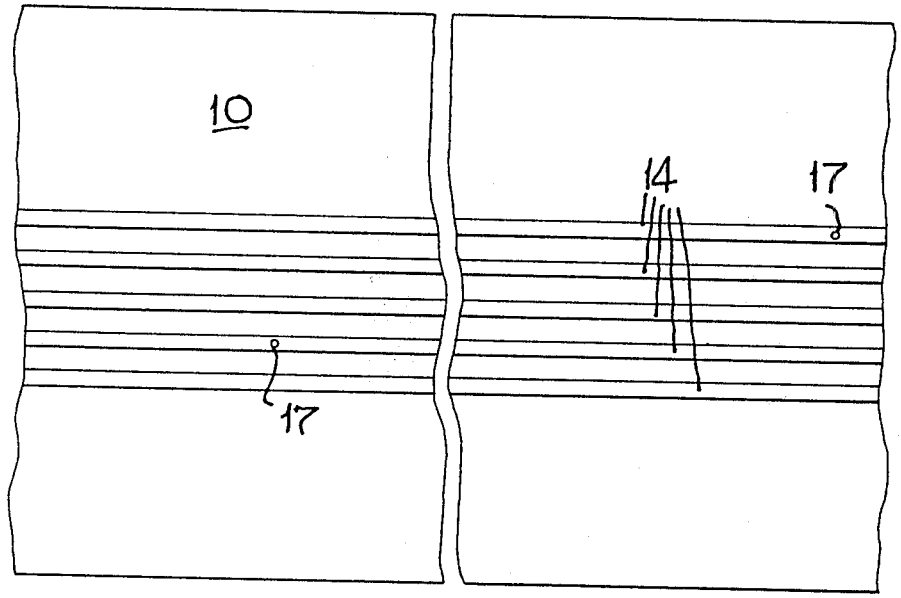
FIG. 5 is a plan of a form of the strip showing the edges formed to be welded together.

In FIG. 1 is shown a strip 10 having a barb 11 at one edge and a barb-receiving socket 12 at the opposite edge whereby the edges may be joined as shown in FIG. 2. The edges could however be plain as shown in FIG. 5 and be welded together or otherwise joined.

The strip has on it a series of capillary tubes 14 formed as the strip is extruded.

Figure 3:
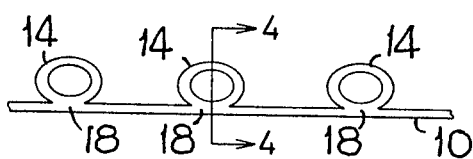
FIG. 3 is a fragmentary end view of part of the strip showing three of the capillary tubes.
Figure 4:
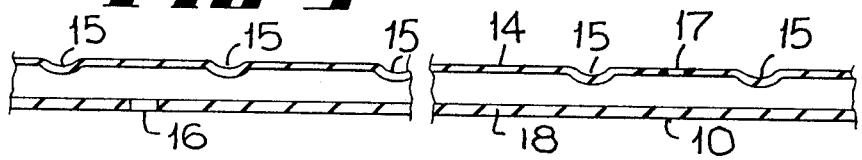
FIG. 4 is a longitudinal section on a capillary tube as on line 4—4 of FIG. 3.

The capillary tubes 14 have on their outer walls a series of transverse dimples 15 as shown in FIG. 3 which serve to cause turbulence to flow through the capillary tubes to aid flow restriction, and an aperture 16 in the main wall of the strip 10 allows water to flow into the capillary, the water leaving the capillary through the aperture 17.

The capillary tubes 14 have a common wall 18 with the tube 10 and it is this wall which is apertured.

In the form shown in FIG. 5 the dimples are not shown as these are not necessarily always present.

Figure 6:
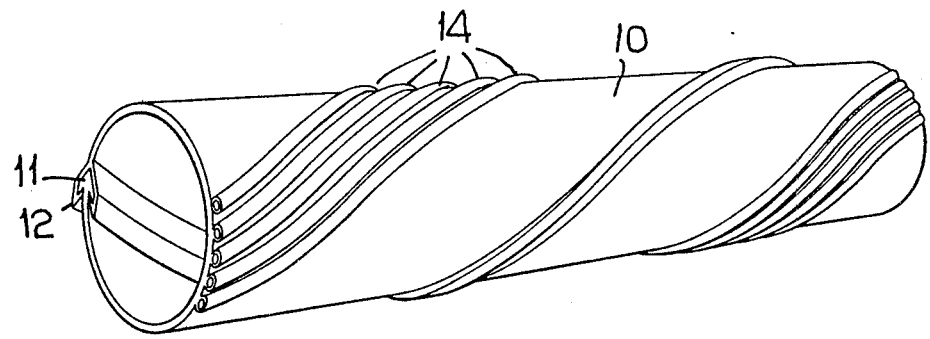
FIG. 6 shows a variation of the strip formed into a tube with a helical formation.

In FIG. 6 the strip is shown completed by winding the strip helically as the edges are joined.

Figure 7:
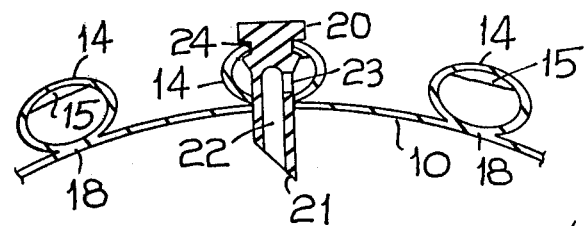
FIGS. 7 and 8 are fragmentary sectional views showing inlet and outlet means which can be used in place of simple apertures.

FIG. 7 shows how the aperture 16 may be formed by inserting a plug 20 which has a piercing end 21 and has a hollow shank 22 opening through an aperture 23 into the capillary 14 to allow a flow of water thereinto. The aperture 24 is sealed by the plug 20.

Figure 8:
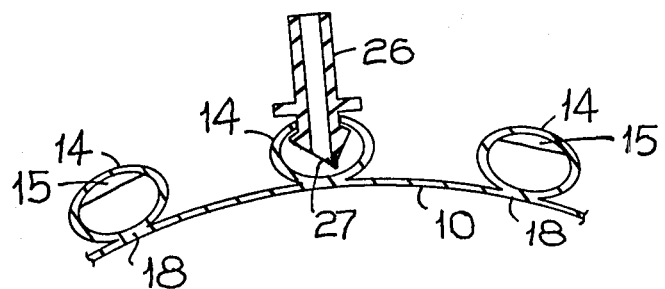

In FIG. 8 is shown how the aperture 17 can be formed by an outlet member 26 which has a piercing barbed end 27 which firmly engages the outer wall of the capillary 14 to provide a take-off point for the water leaving the capillary.

We claim:

1. A continuous drip irrigation tube comprising an extruded strip section having opposite longitudinal edge portions, at least one capillary tube extruded integrally with said strip section, and a common wall forming a portion of said capillary tube, said common wall of the strip having a plurality of inlet apertures leading to the interior of said capillary tube, means for joining said edge portions together to form said strip section into a tubular construction which defines a supply passage, said common wall forming a portion of the supply passage, said inlet apertures providing communication between the supply passage and the interior of the capillary tube, said capillary tube having a plurality of outlet apertures in the wall thereof providing communication between the interior of the capillary tube and the exterior of the drip irrigation tube, and said inlet apertures existing in said common wall even in the absence of said joining means.

2. A continuous drip irrigation strip according to claim 1 wherein the said irrigation tube is formed by joining the edges of the strip section to give a helical configuration to the capillary tube.

3. A continuous drip irrigation tube according to claim 1 wherein one of said edge portions of the strip section has on it a barb formation and the other of said edge portions has a socket formation whereby the strip section can be formed into a tube by engaging the said barb in the said socket.

4. A continuous drip irrigation tube as defined in claim 1 wherein there are a plurality of said capillary tubes extruded integrally with said strip section, each of said capillary tubes has a common wall with the supply passage, each of said common walls has a plurality of inlet apertures providing communication between the supply passage and the interior of the associated capillary tube, each of said capillary tubes having a plurality of outlet apertures in the wall thereof to provide communication between the interior of such capillary tube and the exterior of the drip irrigation tube.

5. A continuous drip irrigation tube as defined in claim 4 wherein the capillary tube has a plurality of spaced dimples along its length to restrict but not block off flow through the capillary tube and wherein one of said edge portions of the strip section has on it a barb formation and the other of said edge portions has a socket formation whereby the strip section can be formed into a tube by engaging the said barb in the said socket.

6. A continuous drip irrigation tube as defined in claim 1 wherein the capillary tube has a plurality of spaced dimples along its length to restrict but not block off flow through the capillary tube.

7. A continuous drip irrigation tube as defined in claim 1 including a hollow outlet member having a piercing barbed end inserted through an aperture in the wall of said capillary tube remote from said common wall, said piercing end terminating in said capillary tube without piercing the common wall.

8. A continuous drip irrigation tube as defined in claim 1 including a plug with a piercing end inserted through an aperture in said capillary tube and extending through an aperture in said common wall, and a passageway in said plug which extends from inside said tube and opens into said capillary tube.

9. A continuous drip irrigation tube as defined in claim 1 wherein said capillary tube is on the exterior of said tubular construction.

* * * * *